United States Patent [19]

Hine

[11] 4,186,474
[45] Feb. 5, 1980

[54] METHOD OF MAKING HEAT EXCHANGER COIL

[75] Inventor: Louis P. Hine, Alameda, Calif.

[73] Assignee: Westinghouse Electric Corp., Pittsburgh, Pa.

[21] Appl. No.: 693,587

[22] Filed: Jun. 7, 1976

[51] Int. Cl.² ............... B23K 1/06; B23K 1/08
[52] U.S. Cl. ............... 29/157.3 A; 29/157.3 B; 228/110; 228/183; 228/262; 228/263; 62/515; 165/144
[58] Field of Search .............. 29/157.3 A, 157.3 B; 228/110, 183, 263, 154, 262; 62/515; 165/144, 150

[56] References Cited

U.S. PATENT DOCUMENTS

| | | | |
|---|---|---|---|
| 2,660,412 | 11/1953 | Sandberg | 62/515 |
| 3,752,381 | 8/1973 | Watson, Jr. | 228/262 |
| 3,760,481 | 9/1973 | Greever | 228/36 |
| 3,831,263 | 8/1974 | Dzierski | 228/262 |
| 3,833,986 | 9/1974 | De Cicco | 29/157.3 A |
| 3,905,789 | 9/1975 | Carpenter | 62/515 |
| 3,920,176 | 11/1975 | Becker et al. | 228/183 |
| 3,942,705 | 3/1976 | Barbay | 228/262 |
| 3,985,280 | 10/1976 | Yamaji et al. | 228/110 |
| 3,989,179 | 11/1976 | Antonevich | 228/110 |
| 3,991,933 | 11/1976 | Antonevich | 228/110 |

FOREIGN PATENT DOCUMENTS

| | | | |
|---|---|---|---|
| 680509 | 5/1930 | France | 165/150 |
| 51-20741 | 2/1976 | Japan | 228/183 |

*Primary Examiner*—Daniel C. Crane
*Attorney, Agent, or Firm*—E. C. Arenz

[57] ABSTRACT

The copper inlet and outlet tube arrangements for an essentially all aluminum coil comprised of aluminum fins, hairpin tubes, and return bends, are ultrasonically soldered to open ends of the hairpin tubes at the same time as the return bends are soldered to the hairpin tubes in an ultrasonic soldering bath; with any bonds of the copper inlet and outlet tube arrangements, such as connections to an expansion device and a connection to a suction header being located at an elevation above the solder bath to preclude contamination of the bath from the bonds.

6 Claims, 4 Drawing Figures

METHOD OF MAKING HEAT EXCHANGER COIL

BACKGROUND OF THE INVENTION

1. Field of the Invention

The invention pertains to the art of making basically aluminum heat exchangers and pertains in particular to a method of making such a coil in which copper transition members such as inlet and outlet tubes are soldered ultrasonically at the same time that all-aluminum other joints are being soldered in an ultrasonic soldering bath.

2. Description of the Prior Art

U.S. Pat. No. 3,833,986 discloses an arrangement for ultrasonically soldering telescopic joints of a basically all aluminum coil, the gist of that invention being the provision of an aperture in the bight end of a hairpin tube to provide venting for the tubing to atmosphere during the ultrasonic soldering process. That patent also suggests that in a prior art process, a practice was utilized in which special vent tubes were inserted into the free ends of the serpentine tubing (i.e., the ends to which inlet and outlet copper tubes are usually typically connected after the ultrasonic soldering), and shaped with angularly turned remote ends projecting out of the solder bath, like snorkel tubes, to communicate the interior of the serpentine tubing with atmosphere so that solder would flow into the telescopic joints. This process is suggested as having difficulties in that the special vent tubes were thereby soldered into the free ends of the serpentine tubing, but were not necessary nor usable in connection with the refrigerant circuit and as a result it was necessary to reform or remove the special tubes involving considerable time and expense.

In the known commercial art of which I am aware, the practice has been to provide a coil arrangement in which the hairpin-shaped tubes, and return bends and other fittings were arranged so that the free ends of the serpentine tubing to which inlet and outlet connections of copper tubing would ultimately be made were located at the end opposite that end which was immersed in the ultrasonic soldering bath. Then, after the ultrasonic soldering had occurred, the copper inlet and outlet tube arrangements were connected to the free ends of the tubes and the soldering was then done manually and individually for each connection. One reason for doing this was that if the inlet and outlet tube arrangements were of manifold character, in which branch tubes were bonded as by brazing to a suction header or expansion device means, the material of the brazed joint would contaminate the ultrasonic solder bath and render it unfit for use in time.

The aim of my invention is to provide a method for making an aluminum heat exchanger coil in which the copper inlet and outlet tube arrangements are soldered to the heat exchanger at the same time and in the same ultrasonic soldering bath in which the solder joints of the hairpin tubes and return bends are made.

SUMMARY OF THE INVENTION

In accordance with the invention, the various aluminum parts of the coil are assembled in the usual manner and with the copper inlet tube means and the copper outlet tube means each having a U-shape and disposed with their legs remote from their ends inserted in the hairpin tubes extending up through a plane corresponding to the level of the surface of a solder bath when the end of the coil having the inlet and outlet tube means is immersed in the solder bath to a predetermined depth, and then immersing that end of the coil to the predetermined depth in an ultrasonic solder bath to effect soldering of both the joints formed between the return bends and the ends of the hairpin tubes, and the joints formed between the copper inlet and outlet tube means and the ends of the hairpin tubes receiving these copper tubes.

The invention is particularly advantageous with multi-row coils in which the copper inlet and outlet tube arrangements will be of a manifold character and in which the branch tubes which are inserted into the hairpin tubes are bonded at their other ends to a suction header, or to expansion device means. In this case the U-shape of the branch tube maintains the level of the bonds between the branch tubes and their connected parts up out of the ultrasonic solder bath so that contamination of the bath by the bond material is avoided.

DRAWING DESCRIPTION

DESCRIPTION OF THE PREFERRED EMBODIMENTS

Figure 1:
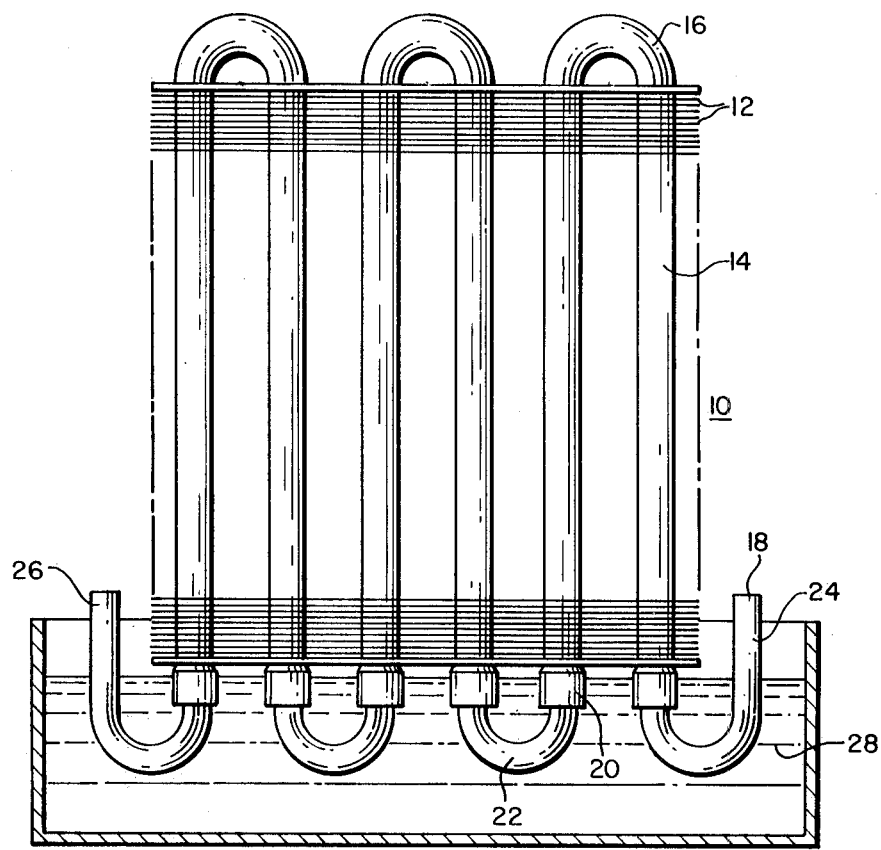
FIG. 1 is a somewhat simplified elevation view of a single row coil, made in a process according to the invention, during its period of immersion in a solder bath.

In FIG. 1 a single row coil 10 is shown in a somewhat simplified view as comprising a series of apertured aluminum fins 12 which are arranged in parallel, stacked relation with the apertures in the fins being aligned and with the legs of the hairpin tubes 14 inserted through the apertures. As shown, the bight ends 16 of the hairpin tubes are all located at one end of the coil 10 with all of the open ends of the hairpin tubes being at the other end or bottom of the coil.

As in conventional, the fins typically have spacing collars formed in the fins at the apertures to hold the fins in slightly spaced apart relation from each other. After the hairpin tubes have been inserted, the legs of the hairpin tubes 14 are expanded in conventional manner to seat the material of the fins forming the apertures tightly against the exterior of the hairpin tube legs, and the ends of the hairpin tubes extending beyond the bottom end plate 18 are expanded slightly to form what are sometimes called belled ends 20.

The U-shaped return bends 22, also of aluminum, are then fitted to most of the belled ends 20 to make the telescopic joints shown. To the extent thus far described, the steps of the manufacturing method are conventional.

Figure 2:
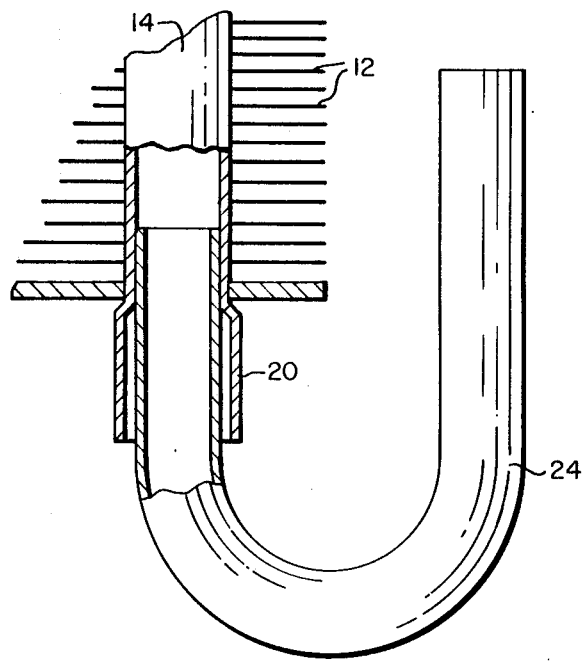
FIG. 2 is a fragmentary, broken view of a joint made between an end of a hairpin tube and a single copper inlet or outlet tube.

In accordance with the invention, a copper inlet tube 24 and a copper outlet tube 26, both having been bent into the general form of a U-shape, are assembled to the coil with the end of one leg of the U projecting up into an open end of a hairpin tube to a point beyond the belled end 20 and up into the non-belled portion of the hairpin tube as best seen in FIG. 2. The end of the inlet or outlet tube 24 or 26 received by the hairpin tube should be inserted at least as far as the end plate 18, and it has been found that good results are obtained when the insertion is sufficiently far that the end is into the fin pack area by a half an inch or more.

The assembly of parts described thus far occurs prior to manipulating the coil to the vertical disposition shown in FIG. 1. Then the coil is placed into the vertical disposition shown and the telescopic joints at the lower end of the coil are preheated. The coil is then lowered into the ultrasonic soldering bath 28 to a predetermined depth as indicated and the ultrasonic soldering of the telescopic joints occurs in a period of say 2 to 5 seconds. Venting of the coil is provided through the open ends of the inlet and outlet tubes. I have found that the solder bath 28 may consist of essentially 100% zinc as the starting material and that as the bath is used the erosion of the aluminum material which occurs during the soldering will result in a composition of about 95% zinc and 5% aluminum if a sample of the solder were taken during its normal use. The ultrasonic soldering pot is basically conventional for the process and is provided with the required ultrasonic vibrators or transducers (not shown).

Figure 4:
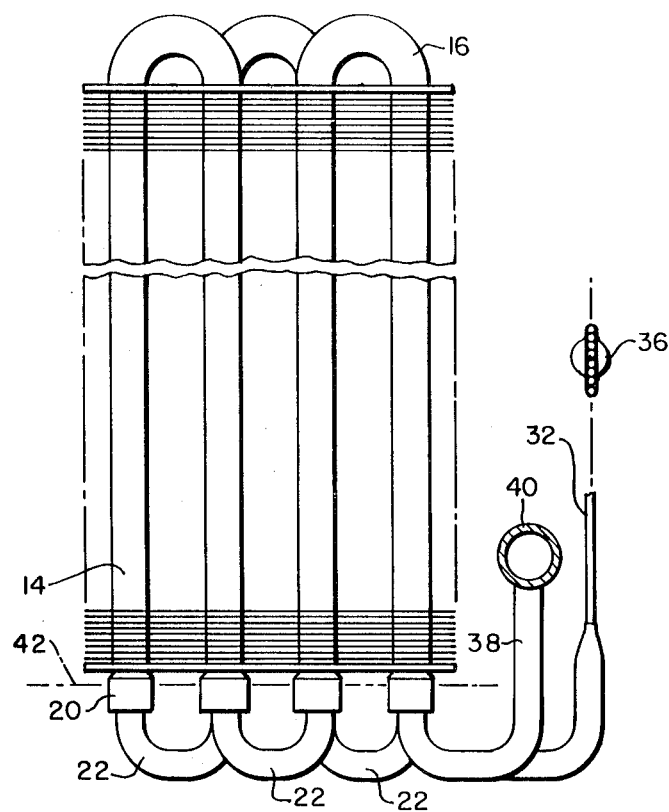
FIG. 4 is a broken, end view of the multi-row coil of FIG. 3.
Figure 3:
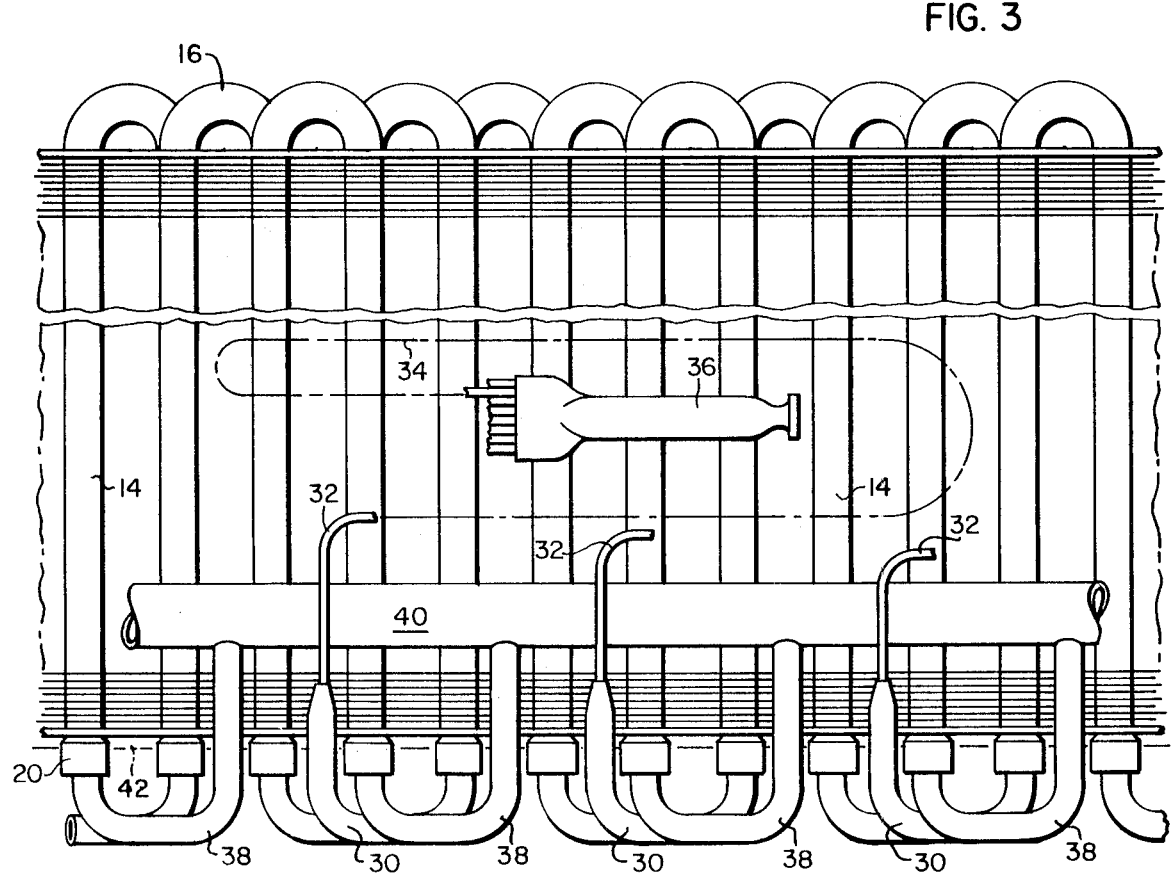
FIG. 3 is a broken, face view of a part of a multi-row coil in which the inlet and outlet tube arrangements are both of a manifold character.

The invention is particularly useful when employed with multi-row heat exchange coils which include copper inlet and outlet manifold arrangements as generally illustrated in FIGS. 3 and 4. In FIG. 3 only a portion of the length of a coil is shown. The inlet manifold arrangement comprises a series of U-shaped copper tubes 30, each of which has one end received in a belled open end of a hairpin tube and has its other end squeezed and bonded to a capillary tube 32. The capillary tubes 32 have lengths determined in accordance with the system design and extend back and forth in serpentine fashion as indicated by the dash line 34 along one face of the coil and terminate in a header 36 to which all the cap tubes are connected by another solder or braze bond. In some arrangements, the inlet branch tubes 30 may be fed from a thermostatic expansion valve, in which case each of the upper ends of the branch tubes 30 would be connected to a header fed by the thermostatic expansion valve.

The outlet tube manifold arrangement comprises U-shaped copper branch outlet tubes 38, each of which has one end received by a belled end 20 of a hairpin tube, and its other end connected in a soldered or brazed joint to a suction header 40. In addition to the telescopic joints formed at the lower end of the coil of FIGS. 3 and 4 between the belled ends 20 of the hairpin tubes and the inlet branch tubes 30 and outlet branch tubes 38, the other telescopic joints are formed by the return bends 22 with the other open belled ends 20 of the hairpin tubes. Depending upon the particular circuiting for the refrigerant flow through the multi-row coil, in addition to the noted telescopic joints at the end of the coil which is to be immersed, there may be other telescopic joints formed by other types of fittings such as aluminum tripods and aluminum crossover fittings (not shown in FIGS. 3 and 4 for simplicity). While a tripod fitting will include a bonded joint, since the tripod is all aluminum the type of bond at the joint is not that which would result in contamination of the solder bath if immersed therein.

In the manufacture of the coil of FIGS. 3 and 4, the fins are stacked, the hairpin tubes 14 are inserted through the apertures and then expanded into the fins, the belled open ends 20 are formed, and the return bends 22 and any other fittings other than the inlet and outlet manifolds are inserted in place. Both the inlet manifold arrangement and the outlet manifold arrangement are made separately as subassemblies. Thus with the inlet manifold arrangement described in connection with FIG. 3, each of the branch copper inlet tubes 30 is formed into its uniform U-shape, the capillary tubes 32 are all bonded to the inlet tubes at one end and have their other ends bonded to the inlet header 36. Likewise, for the outlet manifold arrangement the outlet branch tubes 38 are each formed to the uniform U-shape and the one end of each of the branch tubes 38 is soldered to the suction header 40. This outlet manifold arrangement is then assembled to the coil by pushing the free ends of the branch tubes 38 into the belled ends 20 of selected hairpin tubes. The inlet manifold subassembly is then also assembled to the coil by pushing the free ends of the inlet branch tubes 30 into the remaining open ends of the hairpin tubes.

The coil assembly is then manipulated to the vertical disposition as shown in FIGS. 3 and 4 and moved to a preheat station where the telescopic joints at the lower end of the coil are preheated. The coil is then lowered into an ultrasonic soldering pot to a depth as indicated by the dash line 42 of FIGS. 3 and 4 for the required period of time to effect the soldering. Again the venting is automatically available through the inlet and outlet arrangements. It will be apparent that all of the bonded joints of the copper inlet and outlet manifold arrangements are above the level 42 of the solder bath and accordingly no problem of contamination of the bath from the joints results and the purity of the bath is preserved.

Because the branch tubes of the manifolds extend up into the tube pack as shown in FIG. 2, after the soldering operation has been completed the copper branch tubes 30 and 38 may be bent from their original U-shape to another shape, such as an L-shape, to accommodate the particular geometric arrangement of the unit in which the coil will be installed. Where the manifold arrangement is as shown in FIG. 3 for the outlet tubes connected to a relatively rigid suction header, the U-shape of the outlet branch tubes particularly should be uniform so that the stress as applied at the bell-shape joint areas will be relatively uniform for each of the branch tubes rather than emphasized at one or another. In other words, after the coil joints are soldered, the requirement that brazed or bonded joints of the manifold arrangements remain in a plane which would have been up above the level of the bath during an immersion process no longer exists and the manifold tubes may be bent to whatever position accommodates the needs of the particular air conditioning unit in which the coil is to be installed.

It is of the essence of the invention that the inlet and outlet tube means be of a transition metal, such as copper or another easily soldered material, and that the joints between these tube means and the hairpin tubes be soldered at the same time as the joints between the hairpin tubes and the return bends so that when the coil is removed from the solder bath and cools, the coil is essentially complete at the end which has been immersed.

I claim:

1. In the method of making a fin and tube heat exchange coil comprised of parallel aluminum fins with aligned apertures therein, aluminum hairpin tubes extending through the apertures and with their bight portions at one end of the coil and their open ends extending beyond the last fin at the other end of the coil, aluminum return bends telescopically fitted in the open ends of some of said hairpin tubes at said other end of the coil, and copper inlet tube means and copper outlet tube means fitted telescopically in the open ends of others of said hairpin tubes at the other end of the coil, the steps of:

assembling the parts recited above, with the copper inlet tube means and the copper outlet tube means each having a generally U-shape and disposed with their legs remote from their telescopically connected ends extending through a plane corresponding to the level of the surface of a solder bath when said other end of the coil is immersed in a solder bath to a predetermined depth; and immersing said other end of said coil to said predetermined depth in an ultrasonic solder bath to effect soldering of the telescopic joints situate in the bath thereby forming bonds between the aluminum return bends and the aluminum hairpin tubes and between the copper inlet and outlet tubes and the aluminum hairpin tubes.

2. In the method of claim 1 wherein in the assembling of the parts of claim 1, the steps of:

inserting the ends of said inlet tube means and said outlet tube means into the open ends of said hairpin tubes at least as far as the plane in which said last fin lies to prevent lateral displacement of the hairpin tubes in the vicinity of the ends of the inlet and outlet tubes during any subsequent bending of said inlet and outlet tubes.

3. In the method of claim 1 wherein:

at least one of said inlet tube means and said outlet tube means comprise a manifold in which copper branch are bonded to a copper main tube, and each of said branch tubes has a general U-shape, and disposing the manifold, prior to immersing said other end into said solder bath, with the bonds formed between the branch and main tubes above a level that corresponds to the level of the surface of the bath when the coil other end is immersed to said predetermined depth so that material comprising the bonds will be above the level of the bath during said immersion.

4. In the method of making a multi-row fin tube coil including apertured aluminum fins, hairpin-shaped aluminum tubes, aluminum return bends and a plurality of copper inlet tubes bonded to expansion device means, and a plurality of outlet tubes bonded to a suction header, the steps of:

assembling the tubes and fins with all of the bight ends of the hairpin-shaped tubes at one end of the coil, and assembling said aluminum return bends to form telescopic joints with one portion of the belled open ends of the hairpin tubes projecting through the fins at the other end of the coil;

forming the copper inlet tubes, and the copper outlet tubes, into generally U-shapes and inserting their ends remote from the bonds into the other portions of the belled open ends of the aluminum hairpin tubes sufficiently far that they extend into the non-belled portions of the aluminum hairpin tubes, and with the bonds of the inlet and outlet tubes being disposed in a plane elevated from the general plane in which the telescopic joints lie when the coil is in a vertical position with said one end up and said other end down; and soldering all the joints of said other end of said coil in an ultrasonic solder bath with the bonds of the inlet and outlet tubes lying at an elevation above the surface of the bath so that the bonds of said inlet and outlet tubes do not contribute to contamination of the bath said soldering forming bonds between the aluminum return bends and the aluminum hairpin tubes and between the copper inlet and copper outlet tubes and the aluminum hairpin tubes.

5. In the method of claim 4 wherein:

the U-shape of each of said copper outlet tubes is substantially uniform so that the position of said headers may be changed subsequent to soldering with approximately equal stress being applied to each of the tubes.

6. In the method of making a multi-row fin tube coil including apertured aluminum fins, hairpin-shaped aluminum tubes, aluminum return bends, and inlet and outlet manifold arrangements of copper branch tubes bonded to other tube means of the arrangements, the steps of:

assembling the tubes and fins with all of the bight ends of the hairpin-shaped tubes at one end of the coil, and assembling said aluminum return bends to form telescopic joints with belled open ends of the hairpin tubes projecting through the fins at the other end of the coil;

assembling said inlet and outlet manifolds to the coil with the branch tubes thereof projecting up through the belled open ends of the aluminum hairpin tubes and into the non-belled portions of the aluminum hairpin tubes and with the bonded parts of the manifold arrangements being disposed in a plane elevated from the general plane in which the telescopic joints lie when the coil is in a vertical position with said one end up and said other end down; and soldering all the joints of said other end of said coil in an ultrasonic solder bath with said bonded parts of the manifold arrangements lying at an elevation above the surface of the bath so that the bonded parts of said manifold arrangements do not contribute to the contamination of the bath said soldering forming bonds between the aluminum return bends and the aluminum hairpin tubes and between the copper inlet and outlet branch tubes and the aluminum hairpin tubes.

* * * * *